United States Patent
Zou et al.

(10) Patent No.: US 6,187,407 B1
(45) Date of Patent: Feb. 13, 2001

(54) GLASS SUBSTRATE FOR MAGNETIC RECORDING MEDIUM AND METHOD OF MANUFACTURING THE SAME

(75) Inventors: Xuelu Zou, Akishima; Hisayoshi Toratani, Tokyo, both of (JP)

(73) Assignee: Hoya Corporation, Tokyo (JP)

( * ) Notice: Under 35 U.S.C. 154(b), the term of this patent shall be extended for 0 days.

(21) Appl. No.: 09/190,206

(22) Filed: Nov. 13, 1998

Related U.S. Application Data

(60) Provisional application No. 60/066,046, filed on Nov. 14, 1997, provisional application No. 60/066,051, filed on Nov. 14, 1997, and provisional application No. 60/066,053, filed on Nov. 14, 1997.

(30) Foreign Application Priority Data

Oct. 16, 1998 (JP) .................................................. 10-295869

(51) Int. Cl.[7] ........................................................ G11B 5/66
(52) U.S. Cl. .................................... 428/64.2; 428/694 ST; 428/426; 428/432; 428/900; 427/129; 501/11; 501/53
(58) Field of Search ............................ 428/64.2, 694 ST, 428/900, 426, 432; 427/129; 501/11, 53

(56) References Cited

U.S. PATENT DOCUMENTS

| | | | |
|---|---|---|---|
| 5,391,522 | 2/1995 | Goto et al. | 501/4 |
| 5,972,460 | * 10/1999 | Tochiwaro | 428/64.2 |
| 5,981,015 | * 11/1999 | Zou | 428/64.2 |
| 5,987,977 | * 12/1999 | Zou | 428/64.1 |

FOREIGN PATENT DOCUMENTS 5-32431  2/1993  (JP).

OTHER PUBLICATIONS

"Mechanical Engineer's Handbook", JSME (1987) pp.A4–56–57).
McAllister, Characterization of Disk Vibrations on Aluminum and Alternate Substrates, IEEE Trans. Magnetics, vol. 33, No. 1, (1997) 968–973.
Makishima and Mackenzie, "Direct Calculation of Young's Modulus of Glass", Journal of Non–Crystalline Solids, 12 (1973) 35–45).

* cited by examiner

Primary Examiner—Leszek Kiliman
(74) Attorney, Agent, or Firm—Sughrue, Mion, Zinn, Macpeak & Seas, PLLC

(57) ABSTRACT

In a glass substrate for use in an information recording medium which is specified by Young's modulus E, the Young's modulus E is determined by the following equation (1) so that the Young's modulus exceeds 90, $$E = \Sigma x_i \rho_i \Sigma x_i S_i \quad (1)$$

where $S_i = 2N_A(G_i/M)(4\pi/3)(mR_A^3 + nR_O^3)$, $\rho_i$ is the density of component i, $N_A$ is the Avogadro's number, $G_i$ is dissociation energy of the component i, $M_i$ is molecular weight of the component i, $R_A$ and $R_O$ is ionic radius of cation A and anion O of the component i defined by $A_mO_n$.

11 Claims, 4 Drawing Sheets

GLASS SUBSTRATE FOR MAGNETIC RECORDING MEDIUM AND METHOD OF MANUFACTURING THE SAME

This appln claims the benefit of U.S. Provisional No. 60/066,046 filed Nov. 14, 1997 and Provisional No. 60/066,051 filed Nov. 14, 1997, also Provisional Application 60/066,053 filed Nov. 14, 1997.

BACKGROUND OF THE INVENTION

This invention relates to a glass substrate for use in an information recording medium, such as a magnetic disk (namely, a hard disk), an optical disk, and an optical-magnetic disk.

Recently, both higher data transfer rate and higher capacity have been required for a hard disk drive having high performance, such as a server.

Under the circumstance, disk rotation speed has reached 10000 rpm, and further, track density has become 10000 TPI or 2.5 $\mu$m between tracks.

In addition, it is also necessary to thin the thickness of the disk in order to stack as much number of disks as possible inside the disk drive having a limited size.

In consequence, high stiffness and/or large damping for reducing flutter has been needed, and further, smoothness for small flying height and surface hardness for higher shock resistance have been also required.

In this condition, an aluminum substrate has been widely used for 3.5-inch disk drive in recent years. However, it is difficult to use the aluminum substrate for the disk drive having high performance because the aluminum substrate has relatively low Young's modulus of about 72 GPa. Further, the surface smoothness and the shock resistance should be significantly improved.

On the other hand, a glass substrates have been mainly used for a 2.5-inch disk drive which are equipped with mobile personal computer (thereinafter, abbreviated to PC). In this event, the disk drive must have much better shock resistance capability as compared with that for a desktop-type PC. Further, higher surface hardness is also required for the glass substrates.

Disclosure is made about a N5 glass substrate, which has been widely used, in Japanese Unexamined Patent Publication (JP-A) Hei 5-32431.

More specifically, the glass substrate is a chemical reinforcement glass which contains 62–57% of $SiO_2$, 5–15% of $Al_2O_3$, 4–10% of $Li_2O$, 4–12% of $Na_2O$, and 5.5–15% of $ZrO_2$ by weight %. In this event, the weight ratio of $Na_2O/ZrO_2$ falls within the range between 0.5 and 2.0 while the weight ratio of $Al_2O_3/ZrO_2$ falls within the range between 0.4 and 2.5.

The glass substrate has excellent shock resistance more than 600 G. However, the Young's modulus is 83 GPa that is slightly larger than the aluminum substrate.

In the meanwhile, glass-ceramics substrates have been also introduced into the disk drive market. For example, this glass-ceramics substrate has been disclosed in U.S. Pat. No. 5,391,522. Some of the glass ceramics substrates often have higher Young's modulus.

More specifically, the glass substrate contains 65–83% of $SiO_2$, 8–32% of $Li_2O$, 0–7% of $K_2O$, 0.5–5.5% of MgO, 0–5% of ZnO, 0–5% of PbO, (herein, 0.5–5% of MgO+ZnO+PbO), 1–4% of $P_2O_5$, 0–7% of $Al_2O_3$, 0–2% of $As_2O_3+Sb_2O_3$ by weight %, and contains fine $Li_2O.2SiO_2$ crystal grains as a main crystal.

However, the above-mentioned grass-ceramics substrate has a large crystal grain. As a result, it is difficult to smooth the surface of the substrate. Therefore, large cost is needed so as to smooth the surface.

As mentioned before, the conventional disk substrate does not sufficiently satisfy all of the small surface smoothness, the shock resistance, the high stiffness and/or the large damping for the hard disk having high performance, such as the server.

SUMMARY OF THE INVENTION

It is therefore an object of this invention to provide a glass substrate for an information recording medium which has significantly higher Young's modulus as compared with an aluminum substrate without degrading surface smoothness.

It is another object of this invention to provide an information recording medium using the above glass substrates.

According to this invention, a glass substrate for use in an information recording medium is specified by Young's modulus E. The Young's modulus E is determined by the following equation (1) so that the Young's modulus exceeds 90.

$$E = \Sigma x_i \rho_i \Sigma x_i S_i \qquad (1)$$

where $S_i = 2N_A(G_i/M)(4\pi/3)(mR_A^3 + nR_O^3)$, $\rho_i$ is the density of component i, $N_A$ is the Avogadro's number, $G_i$ is dissociation energy of the component i, $M_i$ is molecular weight of the component i, $R_A$ and $R_O$ are ionic radii of cation A and anion O of the component i defined by $A_mO_n$.

The glass substrate according to this invention has high Young's modulus. Consequently, flutter or vibration can be reduced even when the substrate rotates at a high speed. In particular, the glass substrate can be preferably employed as a substrate used in the hard disk drive having high performance, such as the server.

DESCRIPTION OF THE PREFERRED EMBODIMENT

Principle of the Invention

Figure 1:
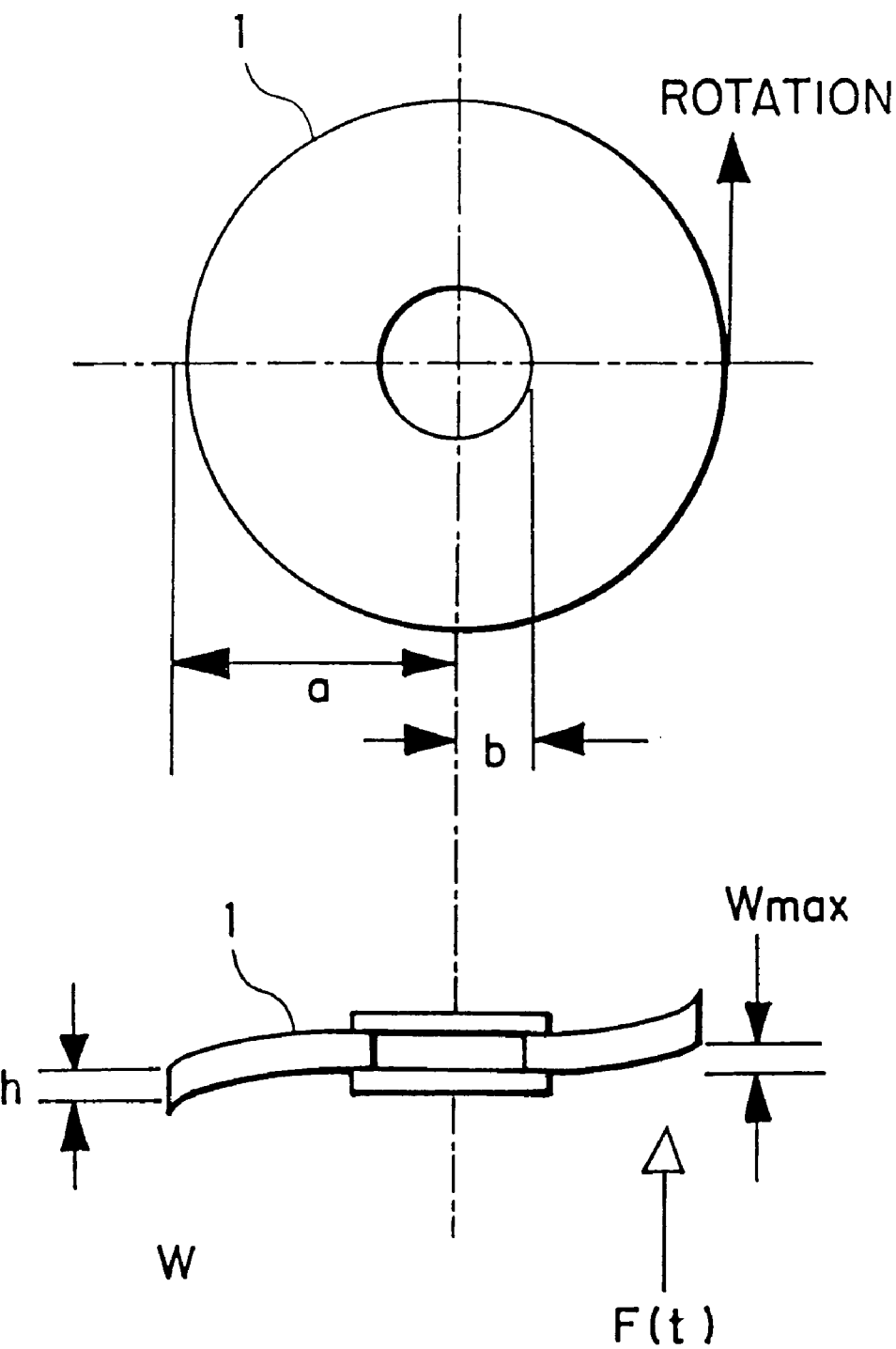
FIG. 1 is a schematic view showing a plan view and a cross sectional view of a disk with respect to flutter or vibration of the disk.

Firstly, description will be made about a process for introducing the above-mentioned equation (1) in more detail.

To develop new glass compositions with high Young's modulus (elastic modulus) or high specific modulus, theoretical calculation model must be derived for determining Young's modulus and/or specific modulus of oxide glasses from their chemical compositions.

According to the theory proposed by Gilman, the Young's modulus E of ionic crystals is approximately derived as follows.

For a pair of ions of opposite sign with the spacing $r_0$, the electrostatic energy of attraction U is given by $U = -e^2/r_0$.

In order to account for many interactions between ions within a crystal, it is multiplied by the Madelung constant α, giving the Madelung energy $U_m = \alpha U$.

Then, the energy between ions is $dU_m/dr$, and the stress σ is $$\sigma = \frac{1}{r_0^2}\left(\frac{dU_m}{dr}\right) \tag{2}$$

The change of stress for a change in r is $d\sigma/dr$, and therefore $$d\sigma = \frac{dr}{r_0^2}\left(\frac{d^2 U_m}{dr^2}\right) \tag{3}$$

but this is just $Ed\epsilon$ where the strain $d\epsilon = dr/r_0$. Thus, $$E = \frac{d\sigma}{d\varepsilon} = \frac{1}{r_0}\left(\frac{\partial^2 U_m}{\partial r^2}\right) = 2\frac{\alpha e^2}{r_0^4} = 2\alpha \frac{U}{r_0^3} \tag{4}$$

Equation (4) shows that the Young's modulus of ionic crystals is inversely proportional to the fourth power of atomic spacing, $r_0$, and two times the binding energy of pair ions, $\alpha U$, per cubic volume of $r_0^3$. This relation was confirmed by many ionic and even covalent crystals, but it has not been evaluated for oxide glasses.

Because of the disordered structure of glass, it is difficult to adopt a meaningful Madelung constant for a glass as well as for crystal oxide.

Therefore, Makishima and Mackenzie propose that instead of αU per unit cubic volume, a more appropriate binding energy for a glass is approximately given by the product of dissociation energy per unit volume, $G_i$, of various oxide components and packing density $V_i$ of the glass, i.e., $$E = 2V_i \sum_i G_i X_i \tag{5}$$

where $X_i$ is the mole fraction of component i in glass and the dissociation energy has been determined by Sun for various oxides.

Makishima and Mackenzie calculated Young's modulus of a single one component glass, such as, silica glass using equation (3), and found out that the calculated value was well agreement with the observed values, proving that equation (3) is satisfactory for estimating Young's modulus of a simple one component glass system.

If it is assumed that a polycomponent glass is a mixture of such "one component glass" systems corresponding to components i, Young's modulus of component i thought to be "one component glass" can be determined from equation (3), i.e., $$E_i = 2V_i G_i \tag{6}$$

where $V_i$ is the packing factor of component i which is agreement to $V_i$ only when the glass is a simple one component system. It is further assumed that the M—O bond energy in one molecule of oxide $M_xO_y$ is similar and its coordination number is the same regardless of the oxide being in the crystal or in the glass, then the packing factor $V_i$ can be determined from the basic properties of the oxide $M_xO_y$ as follows:

$$V_i = \left(\frac{\rho_i}{M_i}\right) 6.023 \times 10^{23} \left(\frac{4}{3}\pi\right)(xR_M^3 + yR_O^3) \tag{7}$$

where $\rho_i$ is the specific gravity and $M_i$ is the molecular weight of $M_xO_y$ and $R_M$ and $R_O$ are the Pauling ionic radii of elements M and O.

Based on the foundational definition of specific modulus (=elastic modulus/specific gravity), the specific modulus $S_i$ of component i in a polycompnent glass can be expressed as:

$$S_i = \frac{E_i}{\rho_i} = 2G_i\frac{V_i}{\rho_i} \tag{8}$$

Substituting equation (5) for (6), then the specific modulus is rewritten as:

$$S_i = 2\left(\frac{G_i}{M_i}\right) 6.023 \times 10^{23} \left(\frac{4}{3}\pi\right)(xR_M^3 + yR_O^3) \tag{9}$$

We have calculated specific modulus for various oxides under assumption that they are in glass state using equation (7).

Then, the specific modulus of polycomponent glasses can be expressed, based on the modified additive theory, as follows:

$$S = \gamma \sum_i S_i X_i \tag{10}$$

where γ is the modified coefficient.

Equation (7) was established under assumption that oxide $M_xO_y$ has the same coordination number regardless of the oxide being in the crystal or in the glass.

In fact, the local structures for various oxides in glasse are generally different with those in the crystals, especially of the coordination numbers.

It has been experimentally found out that such a difference results mainly to variation of the packing densities of oxide components in glasses.

If local structures of oxides do not change when added them into glass, the specific gravity of the glass, based on the additive rule, can be simply evaluated by integrating the specific gravities of the corresponding oxide components weighted by their mole fractions.

However, the measured specific gravities are usually different to the calculated values due to the variation of local structures of oxides. In other words, the difference between the observed and calculated specific gravities of glass reflects variations of local structures of oxide components in the glasses. The modified coefficient γ can be therefore defined as:

$$\gamma = \frac{\sum_i \rho_i X_i}{\rho_m} \tag{11}$$

where $\rho_m$ is the measured specific gravity of the glass.

Therefore, the Young's modulus of the glass can be defined as:

$$E = \gamma S = \sum_i X_i \rho_i \sum_i S_i X_i \quad (12)$$

This equation is very useful for developing new glasses with high modulus, because their Young's modulus can be calculated, before the glass melting, from the glass compositions without any measured parameters of the glasses.

The coefficients of Si and Ei can be utilized to predict chemical compositions that will enable the glasses to have higher possible Young's modulus and specific modulus.

In this respect, the oxides with high modulus coefficients are the expected candidates for preparing a glass with the highest Young's modulus or the highest specific modulus. These oxides may be $Li_2O$, $MgO$, $Al_2O_3$, $Y_2O_3$, and $TiO_2$.

EMBODIMENT

Subsequently, description will be made about a glass substrate for an information recording medium according to this invention.

Herein, it is to be noted that a "glass" in this invention means an amorphous which substantially contains no crystal grain and is essentially different from "crystal glass" or "glass ceramics" which contains crystal grain.

This invention has been realized to obtain material having high Young's modulus E. The necessity for the high Young's modulus E will be explained as follows.

Static deflection of a disk can be evaluated based on the known mechanics theory. A maximum deflection of an outer edge of the disk is described by the following equation (see "Mechanical Engineer's Handbook", JSME (1987) pp. A4–57).

$$W_{max} = (Fa^4/Eh^3)f(v) \quad (13)$$

where $W_{max}$ is the maximum deflection, F is force applied to the disk, a is outside radius of the disk, E is Young's modulus, h is a thickness of the disk, and $f(v)$ is a function of Poisson's ratio, and is a parameter of outside radius and inside radius of the disk.

In this event, the force F applied to the disk is equal to the gravity force. Namely, the force F is represented by the following equation.

$$F = \rho h \quad (14)$$

where $\rho$ is density of the disk. Therefore, the above equation (13) is restated as follows.

$$W_{max} = (\rho a^4/Eh^2)f(v) = (a^4/Gh^2)f(v) \quad (15)$$

where G is specific modulus. In this case, the specific modulus is important as a material parameter in the static deflection.

On the other hand, the force, which is applied to the disk during the rotation of the disk, is in dependency upon time, and has excessively complex nature, as illustrated in FIG. 1.

A turbulent air that flows inside the drive becomes primary force. In this condition, function F of the force is increased as rotation speed of the disk is raised up.

Maximum deflection depending upon time, namely flutter, is mainly determined by Young's modulus as a material parameter.

Under this circumstance, the flutter of disk increases when natural frequency of a disk assembly matches with frequency of forcing function driven by the airflow.

In a simple one-dimensional model of forced vibration with damping, amplitude of vibration at the resonance is given by the following equation.

$$X = F/(c\omega_i) \quad (16)$$

where c is damping constant and $\omega_i$ is the natural frequency of the system.

A magnitude of the force caused by the airflow decreases with frequency. Therefore, the vibration amplitude is reduced as the natural frequency is increased (see J. S. McAllister: IEEE Trans. Magnetics, 33 (1997) 968–973).

It has been well known that the natural frequency increases with the square root of the specific modulus. It indicates that higher specific modulus is also an important material parameter, but is less effective than Young's modulus.

The damping factor is another important parameter. However, the damping factor is not in dependency upon the material of the disk, and largely depends upon friction between the disk and the cramp assembly in the case of the disk made of aluminum, glass and glass-ceramics.

In this case, the Young's modulus is determined by the composition of the glass. In general, the smaller molar volume of the glass, the larger the Young's modulus. A model for calculating the Young's modulus has been proposed by Makishima and Mackenzie (see A. Makishima and J. D. Mackenzie: J. Non-Crystalline Solids, 12 (1973) 35–45).

The equation is represented by the following equation:

$$E = 2(\rho/M)$$
$$V_i = N_A(4\pi/3)(mR_A^3 + nR_O^3) \quad (17)$$

where $\rho$ is the density of the glass, M is molecular weight of the glass, $x_i$ is mole fraction of the component i, $G_i$ is dissociation energy of the component i, $V_i$ is the packing factor for the component i, NA is the Avogadro's number, $R_A$ and $R_O$ is the ionic radius of cation A and anion O of the component i defined by $A_mO_n$.

In this event, measured Young's modulus is almost in agreement with that calculated by this model for the glass with lower Young's modulus E.

However, large discrepancy was observed for the glass having the Young's modulus of 100 GPa or more. In order to develop higher Young's modulus, the above-mentioned equation has been modified into the following equation (18).

$$E = 2\chi \Sigma x_i G_i \Sigma x_i V_i$$
$$V_i = (\rho_i/M_i)N_A(4\pi/3)(mR_A^3 + nR_O^3)$$
$$\chi = \rho/(\rho + \Delta\rho) \quad (18)$$

Where $\rho$ is the density of the glass, $\rho_i$ is the density of the component i, $\Delta\rho$ is the density by addition of specific component, $M_i$ is the molecular weight of the glass, $x_i$ is the mole fraction of the component i, $G_i$ is the dissociation energy of the component i, $V_i$ is the packing factor of the component i, $N_A$ is the Avogadro's number, and $R_A$ and $R_O$ are the ionic radii of cation A and anion O of the component i defined by $A_mO_n$.

However, the specific gravity $\rho$ of the entire glass is used as corrective coefficient in the above equation (18). In consequence, the specific gravity ρ must be measured by actually fabricating the glass to calculate the Young's modulus.

Therefore, new calculation equation is required to obtain the Young's modulus without actually fabricating the glass. To satisfy this requirement, the above-mentioned equation (1) has been made.

Specifically, a new calculation method, in which the Young's modulus is determined based upon the specific modulus, has been adopted in the equation (1) according to this invention. Thereby, it is possible to determine the Young's modulus without actually measuring the specific gravity ρ of the entire glass. Namely, the Young's modulus can be readily determined without actually manufacturing the glass.

More specifically, when $E_i=2V_iG_i$ is used and the above equation (18) is used as $V_i$, the specific modulus $S_i$ of the component i becomes as follows.

$$S_i=E_i/\rho=2G_iV_i/\rho_i=2N_A(G_i/M)(4\pi/3)(mR_A^3+nR_O^3). \quad (19)$$

Thus, $\rho_i$ (specific gravity of the component i) is finally eliminated in this equation.

Subsequently, when $S=\gamma\Sigma x_iS_i$ is used as the specific modulus of the glass and $\gamma=(\Sigma\rho_ix_i)/\rho$ is used as γ (corrective coefficient of the specific modulus), the Young's modulus is represented by the following equation because the Young's modulus is defined as E=(specific gravity ρ)×(the specific modulus S).

$$E=\Sigma\rho_iX_i\Sigma S_iX_i \quad (20)$$

It is found out that the specific gravity ρ is also eliminated from this equation.

As a result, the Young's modulus can be readily determined without measuring the specific gravity of the glass according to the equation (1) of this invention.

As mentioned before, the Young's modulus calculated by the above equation (17) often indicates a value near measured value. However, there is large deviation between the calculated value and the measured value with respect to the glass having the Young's modulus of 90 Gpa or more (preferably, 100 Gpa or more).

At the same time, the specific gravity must be measured by actually manufacturing the glass in order to determine the Young's modulus according to the above equation (17).

Therefore, it has been found out that the calculated value is approximate with the measured value in the glass having the Young's modulus of 90 GPa or more (preferably, 100 PGa or more) by using the above equation (1) of this invention.

Thus, the equation (1) of this invention is introduced via the above-mentioned process, and does not suggest mere or simple calculation method. The equation (1) of this invention can achieve the above-mentioned remarkable effect, and has been made so as to solve the problem inherent to the substrate for the information recording medium.

In particular, this invention relates to a method for determining the Young's modulus for an oxide glass having high Young's modulus. It is possible to determine the Young's modulus without actually fabricating the glass. This is extremely useful for designing the material of the glass.

In contrast, although the conventional method of determining the Young's modulus has relatively high accuracy in a region having low Young's modulus, it has low accuracy in a region (90 GPa or more) having high Young's modulus which is required for the glass substrate for the information recording medium, as mentioned above.

Namely, rare earth oxide, such as $SiO_2$, $B_2O_3$, $Al_2O_3$, MgO, CaO, $Li_2O$, $TiO_2$, ZnO, $ZrO_2$, and $Y_2O_3$, $La_2O_3$, $CeO_2$, $Pr_2O_3$, $Sm_2O_3$, $Eu_2O_3$, $Ga_2O_3$, $Tb_2O_3$, $Dy_2O_3$, $Ho_2O_3$, $Er_2O_3$, $Tm_2O_3$, $Yb_2O_3$ are suitably selected so that the Young's modulus E exceeds 90 in the above equation (1) according to this invention.

When the Young's modulus is smaller than 90, deviation takes place between the measured value and the calculated value. Consequently, it is impossible to obtain the glass having the desired high Young's modulus. It is preferable that the Young's modulus exceeds 95, and it is further desirable that it exceeds 100. Herein, it is to be noted that although the higher Young's modulus is more preferable, the range obtained as the glass is 150 GPa or less.

Figure 2:
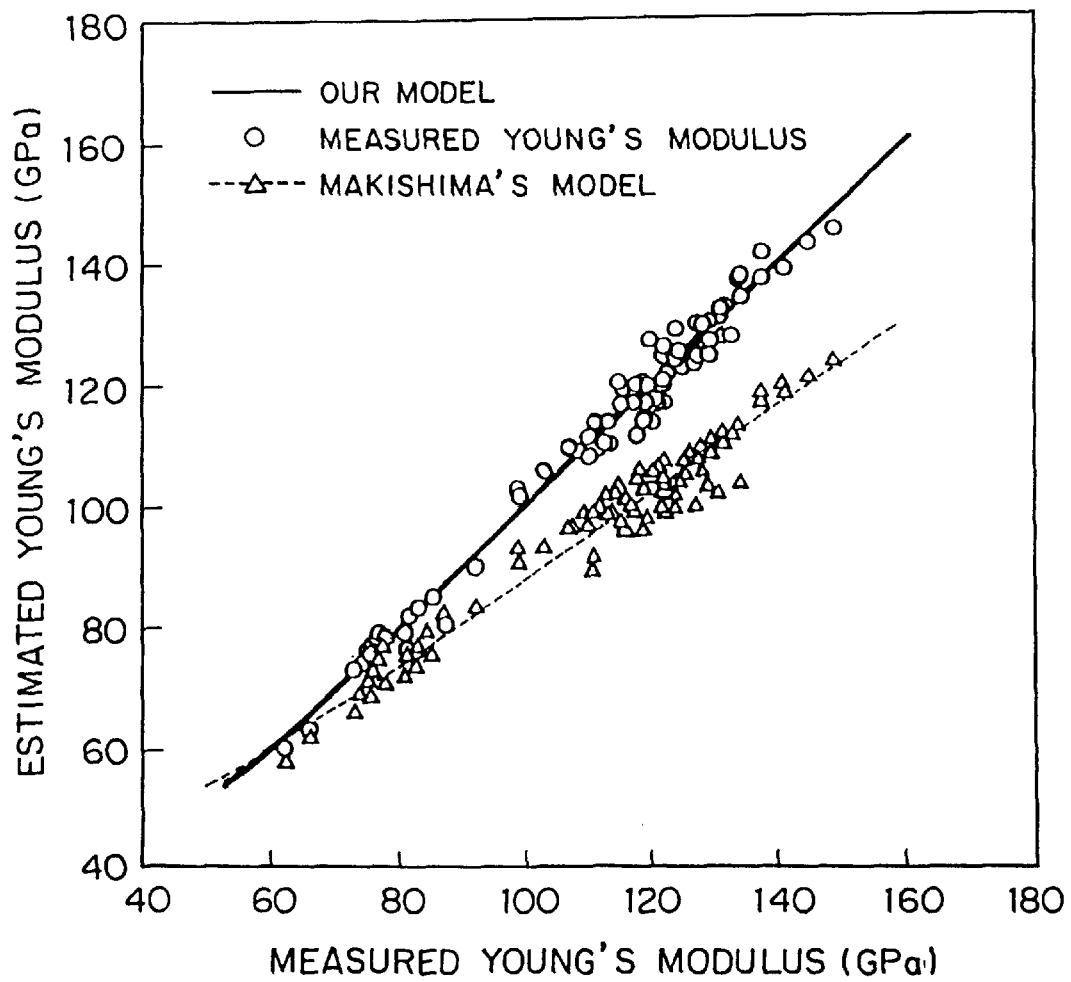
FIG. 2 is a graph showing a relationship between measured Young's modulus and estimated Young's modulus.

As illustrated in FIG. 2, it is confirmed that the calculated Young's modulus is approximate with the measured Young's modulus in the Young's modulus of 90 GPa by using the equation (1) of this invention.

Subsequently, description will be made about an information recording medium according to this invention.

The information recording medium includes the glass substrate for the information recording medium and a recording medium layer formed thereon. Herein, "the recording layer formed on the grass substrate" means a recording layer which is formed on the glass substrate in a direct manner or via a desired layer.

In this event, the recording medium has a single layer structure or a multi-layer structure. In this case, the material or the layer structure of the recording layer is suitably selected so as to serve as an magnetic recording layer, an optical recording layer, and an optical magnetic recording layer and the like in accordance with the kind of the information recording medium.

Subsequently, description will be made about a magnetic disk according to this invention.

The magnetic disk includes the glass substrate for the information recording medium and a magnetic recording layer formed thereon.

Thereinafter, description will be made about the magnetic disk (namely, a hard disk) which has at least a magnetic layer on a principle surface of the glass substrate according to this invention.

The magnetic disk optionally includes an underlying layer, a protective layer, a lubricating layer, an unevenness control layer and the like depending upon functions of the disk as layers other than the magnetic layer. These layers can be formed by various thin film-forming techniques.

In this event, material for the magnetic layer is not particularly limited. For example, a ferrite-magnetic layer, an iron-rare earth metal magnetic layer and the like may be used in addition to a Co magnetic layer. The magnetic layer may be formed by either of horizontal magnetic recording or vertical magnetic recording.

A specific example of the magnetic layer includes, for example, a magnetic thin film containing Co as a main component, such as CoPt, CoCr, CoNi, CoNiCr, CoCrTa, CoPtCr, and CoNiCrPt, CoNiCrTa, CoCrPtTa, CoCrPtSiO and the like. Alternatively, the magnetic layer may be a multiple layer which is formed by dividing the magnetic layer by the use of a non-magnetic layer to reduce noise.

The underlying layer of the magnetic layer may be selected depending upon the nature of the magnetic layer. For instance, the underlying layer may be at least one selected from the group consisting of non-magnetic metals, such as Cr, Mo, Ta, Ti, W, V, B and Al, or oxides, nitride, carbides and the like of these metals.

In a magnetic layer containing Co as the main component, an underlying layer of pure Cr or Cr alloy is preferable to improve magnetic characteristics. Herein, the underlying layer is not limited to a monolayer, and may be composed of multiple layers consisting of identical or different layers. For example, the underlying layer may be a multi-layer underlying layer, such as, Al/Cr/CrMo and Al/Cr/Cr.

Moreover, the unevenness control layer may be provided between the glass substrate and the magnetic layer or on the magnetic layer in order to prevent absorption of the magnetic disk to the magnetic head. Surface roughness of the magnetic disk is properly adjusted by providing the unevenness control layer. Consequently, the magnetic head does not absorb with the magnetic disk. As a result, the magnetic disk having high reliability can be obtained.

Various materials and forming methods for the unevenness control layer have been known, and they are not particularly limited. For example, the material of the unevenness control layer may be at least one metal selected from the group consisting of Al, Ag, Ti, Nb, Ta, Bi, Si, Zr, Cr, Cu, Au, Sn, Pd, Sb, Ge, Mg and the like, alloys thereof, oxides, nitrides, carbides thereof and the like.

A metal containing Al as a main component, such as, pure Al, Al alloys, Al oxides and Al nitrides are desirable from the viewpoint of easy production.

Surface roughness $R_{max}$ of the unevenness forming layer preferably falls within the range between 50 and 300 Å, and more preferably, within the range between 100 and 200 Å when excellent head stiction is taken into consideration.

When the $R_{max}$ is less than 50 Å, the disk surface is nearly flat, and hence, the magnetic head and the disk are absorbed to each other. This may disadvantageously cause damage of the magnetic head and the magnetic disk. Further, head crash often takes place due to the absorption. On the other hand, when the $R_{max}$ exceeds 300 Å, glide height becomes larger, and as a result, recording density is disadvantageously lowered.

Unevenness may be provided on the surface of the glass substrate by a texturing treatment, such as, etching treatment and irradiation of laser light beam instead of providing the unevenness control layer.

The protective layer may be, for example, a Cr layer, Cr alloy layer, carbon layer, zirconia layer, silica layer or the like. The protective layer can be successively formed by the known inline sputtering apparatus together with the underlying layer, the magnetic layer and the like. The protective layer may have either of monolayer structure or multilayer structure consisting of identical or different layers.

Another protective layer may be provided thereon instead of the protective layer. For instance, a silicon oxide ($SiO_2$) layer may be formed on the protective layer by applying tetraalkoxysilane diluted in an alcoholic solvent, in which colloidal silica is further dispersed, and sintering the applied layer. This layer serves as both the protective layer and the unevenness control layer.

While various kinds of layers have been proposed as the lubricating layer, it is generally formed by applying a liquid lubricating agent, perfluoropolyether, diluted in a solvent, such as freons by dipping, spin coating, spraying or the like and subjecting the coated layer to a heat treatment as required.

EXAMPLE

Subsequently, description will be made about an example of this invention.

Table 1 represents glass compositions (mol %) of examples 1 to 4 and a comparative example 1, and Young's modulus of the glass composition and measured Young's modulus.

TABLE 1

| Example | 1 | 2 | 3 | 4 | (mol %) Comparative Example 1 |
|---|---|---|---|---|---|
| SiO2 | 45 | 47 | 40 | 45.5 | 100 |
| B2O3 | | | | 2.7 | |
| Al2O3 | 2 | 15 | 17.5 | | |
| ZnO | | | | | |
| MgO | 12.5 | 31 | 20.5 | | |
| CaO | 12.5 | | | 20.5 | |
| La2O3 | | | | | |
| Gd2O3 | | | | 0.6 | |
| Y2O3 | | 4 | 12.0 | | |
| ZrO2 | 2 | | | 3.8 | |
| TiO2 | 13 | 3 | 10.0 | 7.6 | |
| Ta2O5 | | | | | |
| Nb2O5 | | | | 1.6 | |
| Li2O | 10.4 | | | 17.7 | |
| Na2O | 2.6 | | | | |
| E | 107.5 | 118.5 | 132.6 | 107.2 | 73 |
| Young's Modulus (Gpa) | 112 | 119 | 133 | 110 | 72 |

In this case, the Young's modulus E is a value calculated by the use of the above-mentioned equation (1) in Table 1. On the other hand, the measured Young's modulus is determined as follows.

First, a sample of 20×20×100 mm was fabricated. In this event, vertical wave rate ($V_l$) and lateral wave rate ($V_s$) when supersonic wave of 5 MHz transmitted in the sample were measured by the use of the sing-around type acoustic velocity apparatus (UVM-2 made Supersonic Industry Company). Thereafter, the measured Young's modulus was determined by the following equation.

$$E = (4G^2 - 3G \cdot V_l^2 \cdot \rho)/(G - V_l^2 \cdot \rho) \qquad (21)$$

$$G = V_s^2 \cdot \rho$$

$\rho$: specific gravity of sample (g/cm$^3$)

First, compositions were determined by the equation (1) so that the Young's modulus exceeds 90, as shown in the example 1 to 4. Further, a glass having the Young's modulus E exceeding 90 was prepared in the comparative example.

Subsequently, these glasses were actually manufactured. In this case, $SiO_2$, $B_2O_3$, $Al_2O_3$, $ZnO_2$, MgO, $CaCO_3$, $Li_2CO_3$, and the like were used as starting materials when these glasses were dissolved. Thereafter, these materials were weighed and sufficiently mixed to form a compound batch. Next, the batch was placed in a Pt crucible, and the glasses were dissolved at 1550° C. during 3 to 5 hours in the air.

After dissolving, glass solution was flowed into a die made carbon having of size of 180×15×25 mm or φ67 mm×5 mm. Next, the glass solution was cooled to a temperature of a transition point of the glass, and was immediately placed in an anneal furnace.

Thereafter, the glass solution was annealed in the range of the transition temperature of the glass during about one hour, and cooled to the room temperature in the furnace.

In the obtained glass, crystal, which could be observed by the microscope, was not precipitated. Further, the obtained glass was cut in a disk shape, and was processed the principle surface by polishing by the use of an oxidation cerium. Thereby, the substrate for the magnetic disk, which had outer radius of 95 mm, inner radius of 25 mm and a thickness of 0.8 mm, was obtained.

Disk Flutter Measurements

Figure 3:
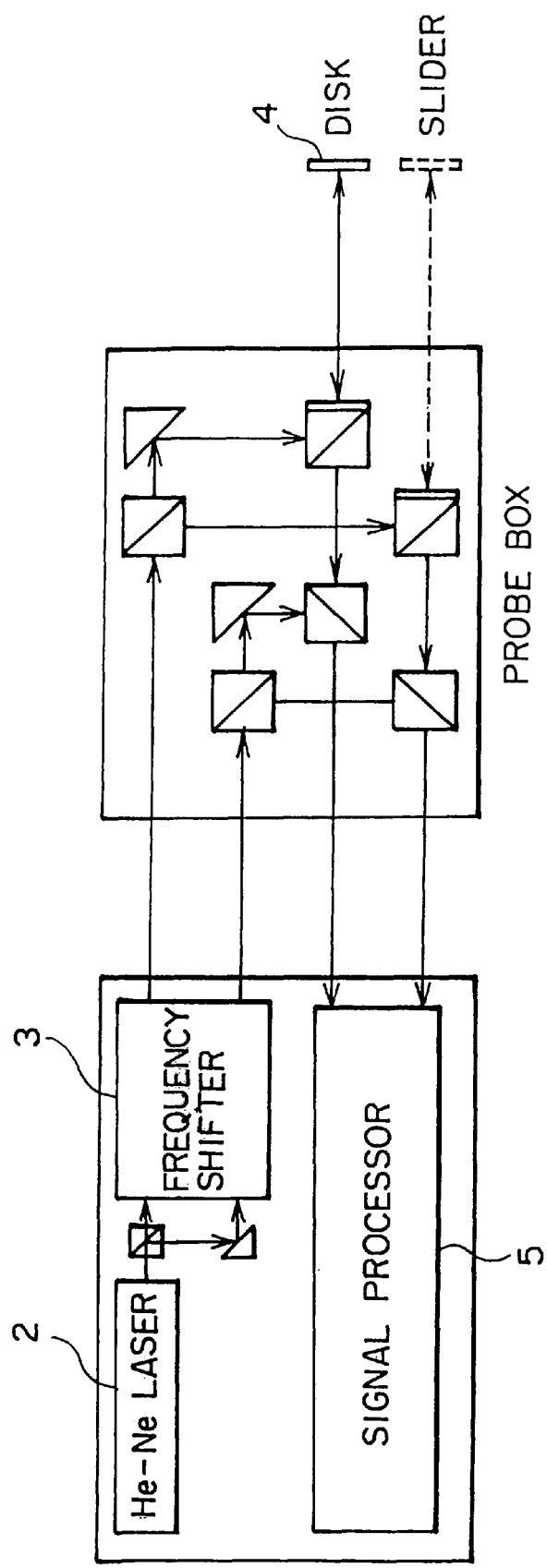
FIG. 3 is a schematic diagram showing a structure of a heterodyne displacement meter.

A heterodyne displacement meter (namely, HDM) was employed to characterize vibration behavior of the different disk substrates rotating at speed between 1000 rpm and 10000 rpm. Herein, a schematic configuration of the HDM is shown in FIG. 3.

With such a structure, an output of He-Ne laser 2 was divided into two beams with frequency modulation of 80 MHz and 81 MHz by the use of a frequency shifter 3. Each beam was again divided into two beams with beam splitters, respectively.

A first beat signal carries information of a probe beam reflected from a disk 4. A second beat signal carries information of another probe beam.

From phase difference between the first beat signal and the second beat signal, modulated displacement of the disk surface was obtained as a function of time. The Fast Fourier Transform of the amplitude modulated signal results in amplitude of vibration as a function of vibration frequency.

Disk flutter at 10000 rpm was evaluated by integrating the area under the trace in each of these modes. To do that, the spectra were converted to power spectral density units. The results are shown in FIG. 4 for the 3.5-inch disks.

Figure 4:
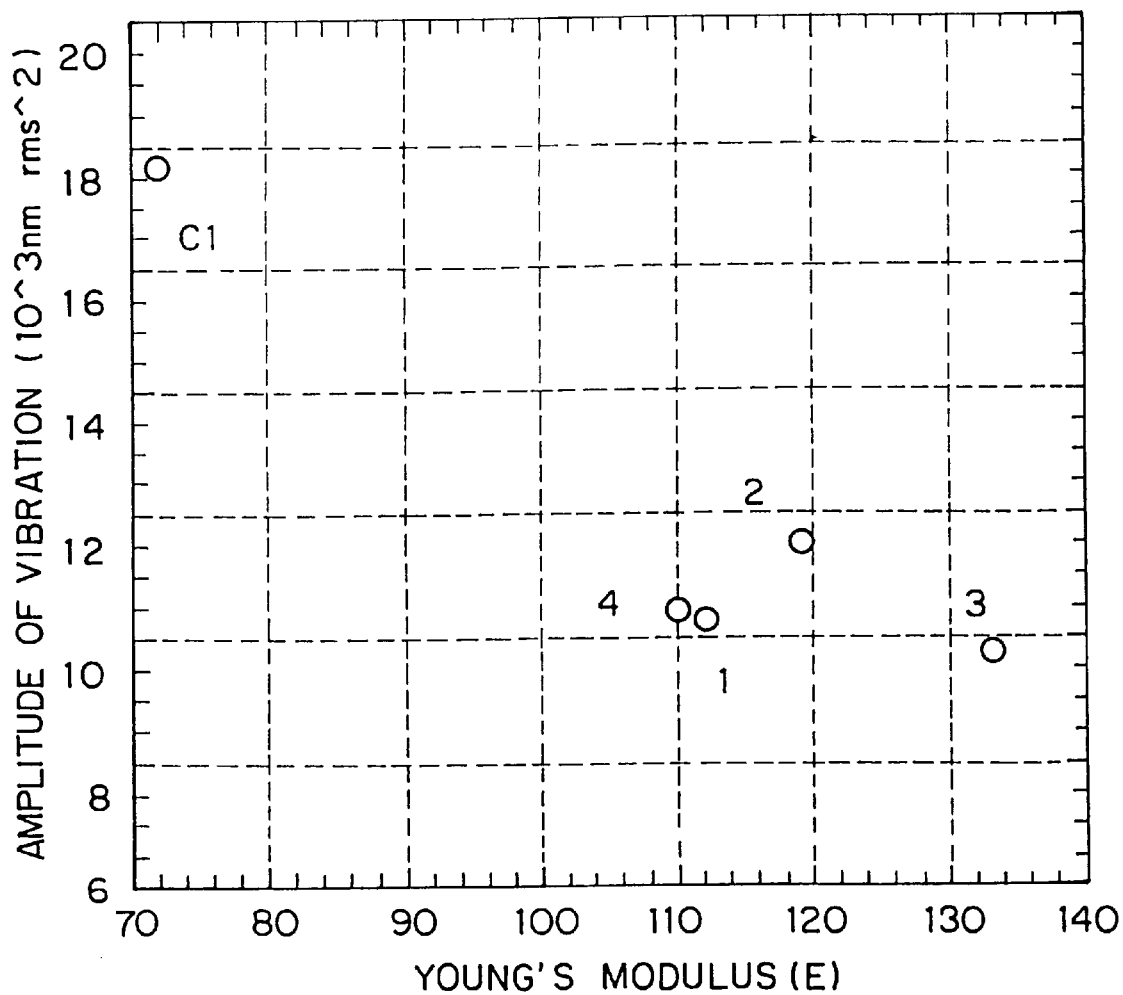
FIG. 4 is a graph showing a relationship between Young's modulus and amplitude of vibration.

In FIG. 4, all the reproducible modes originated from the axial disk run-out from non-perpendicularity, the clamping distortion and the disk surface distortion were eliminated in the process of averaging signals. The traces were integrated from 150 Hz to 2500 Hz.

In this event, FIG. 4 shows a relationship between amplitude of vibration and Young's modulus. It is confirmed from FIG. 4 that the amplitude of vibration is small in the glass substrate according to this invention.

In the meanwhile, it is to be noted that the Young's modulus calculation device according to this invention can be readily realized by the use of the well-known computer system. In this event, the computer system mainly includes an input device, such as a keyboard, a calculation device, such as a computer, and an output device, such as, a printer.

What is claimed is:

1. A glass substrate for use in an information recording medium which is specified by Young's modulus E, wherein: the Young's modulus E is determined by the following equation (1) so that the Young's modulus exceeds 90, $$E = \Sigma x_i \rho_i \Sigma x_i S_i \tag{1}$$

where
$S_i = 2N_A(G_i/M) (4\pi/3) mR_A^3 + nR_O^3)$, and where:
$\rho_i$ is the density of component i of glass in g/cm$^3$,
$N_A$ is the Avogadro's number $6.023 \times 10^{23}$ ions/mol,
$G_i$ is the dissociation energy per unit volume of the component i of the glass in kcal/cm$^3$,
$M_i$ is molecular weight of the component i of the glass in g/mol,
$R_A$ and $R_O$ are the ionic radius of cation A and anion O of the component i defined by $A_mO_n$ in units of $10^{-8}$ cm.

2. An information recording medium, comprising:
a recording layer which is formed on said glass substrate claimed in claim 1.

3. A magnetic disk, comprising:
a magnetic recording layer which is formed on said glass substrate claimed in claim 1.

4. A method of manufacturing a glass substrate for use in an information recording medium which is specified by Young's modulus E, comprising the step of:
selecting composition of said glass substrate so that the Young's modulus E is determined by the following equation (1) and the Young's modulus exceed 90, $$E = \Sigma x_i \rho_i \Sigma x_i S_i \tag{1}$$

where $S_i = 2N_A(G_i/M) (4\pi/3) (mR_A^3 + nR_O^3)$, $\rho_i$ is density of component i, $N_A$ is the Avogadro's number, $G_i$ is dissociation energy of the component i, $M_i$ is molecular weight of the component i, $R_A$ and $R_O$ is ionic radius of cation A and anion O of the component i defined by $A_mO_n$.

5. A device for calculating Young's modulus of a glass substrate for use in an information recording medium, comprising:
input means for inputting $\rho_i$ (density of component i), $N_A$ (the Avogadro's number), $G_i$ (dissociation energy of the component i), $M_i$ (molecular weight of the component i), $R_A$ and $R_O$ (ionic radius of cation A and anion O of the component i defined by $A_mO_n$) as parameters;
calculating means for calculating the Young's modulus of said glass substrate by the use of the following equation (1), based upon the inputted parameters; and $$E = \Sigma x_i \rho_i \Sigma x_i S_i \tag{1}$$

where $S_i = 2N_A(G_i/M)(4\pi/3) (mR_A^3 + nR_O^3)$
outputting means for outputting the calculated Young's modulus.

6. A device as claimed in claim 5, wherein:
said inputting means comprises a keyboard.

7. A device as claimed in claim 5, wherein:
said output means comprises a printer.

8. A method for calculating Young's modulus of a glass substrate for use in an information recording medium, comprising the steps of:
inputting $\rho_i$ (density of component i), $N_A$ (the Avogadro's number), $G_i$ (dissociation energy of the component i), $M_i$ (molecular weight of the component i), $R_A$ and $R_O$ (ionic radius of cation A and anion O of the component i defined by $A_mO_n$) as parameters;
calculating the Young's modulus of said glass substrate by the use of the following equation (1), based upon the inputted parameters;

$$E = \Sigma x_i \rho_i \Sigma x_i S_i \tag{1}$$

where $S_i = 2N_A(G_i/M) (4\pi/3) (mR_A^3 + nR_O^3)$; and
outputting the calculated Young's modulus.

9. A recording medium for calculating Young's modulus of a glass substrate for use in an information recording medium, said recording medium recording a program to execute the steps of:
inputting $\rho_i$ (density of component i), $N_A$ (the Avogadro's number), $G_i$ (dissociation energy of the component i), $M_i$ (molecular weight of the component i), $R_A$ and $R_O$ (ionic radius of cation A and anion O of the component i defined by $A_mO_n$) as parameters;

calculating the Young's modulus of said glass substrate by the use of the following equation (1), based upon the inputted parameters;

$$E = \Sigma x_i \rho_i \Sigma x_i S_i \qquad (1)$$

where $S_i = 2N_A(G_i/M)(4\pi/3)(mR_A^3 + nR_O^3)$; and outputting the calculated Young's modulus.

10. A method of estimating Young's modulus of a glass substrate for use in an information recording medium, wherein:

the Young's modulus E is determined by the following equation (1) so that the Young's modulus exceeds 90 without practically manufacturing said glass substrate, $$E = \Sigma x_i \rho_i \Sigma x_i S_i \qquad (1)$$

where $S_i = 2N_A(G_i/M)(4\pi/3)(mR_A^3 + nR_O^3)$, $\rho_i$ is density of component i, $N_A$ is the Avogadro's number, $G_i$ is dissociation energy of the component i, $M_i$ is molecular weight of the component i, $R_A$ and $R_O$ is ionic radius of cation A and anion O of the component i defined by $A_mO_n$.

11. A method of estimating Young's modulus of a glass substrate for use in an information recording medium, wherein:

the Young's modulus E is determined by the following equation (1) so that the Young's modulus exceeds 90 without practically measuring specific gravity of said glass substrate, $$E = \Sigma x_i \rho_i \Sigma x_i S_i \qquad (1)$$

where $S_i = 2N_A(G_i/M)(4\pi/3)(mR_A^3 + nR_O^3)$, $\rho_i$ is density of component i, $N_A$ is the Avogadro's number, $G_i$ is dissociation energy of the component i, $M_i$ is molecular weight of the component i, $R_A$ and $R_O$ is ionic radius of cation A and anion O of the component i defined by $A_mO_n$.

* * * * *

UNITED STATES PATENT AND TRADEMARK OFFICE
CERTIFICATE OF CORRECTION

PATENT NO. : 6,187,407 B1
APPLICATION NO. : 09/190206
DATED : February 13, 2001
INVENTOR(S) : Xuelu Zou and Hisayoshi Toratani It is certified that error appears in the above-identified patent and that said Letters Patent is hereby corrected as shown below:

Please amend in the claims as follows:

Column 11, line 55, change "where $S_i = 2N_A(G_i/M)\ (4\pi/3)\ mR_A^3 +1\ nR_o^3$)," to --where $S_i = 2N_A(G_i/M)\ (4\pi/3)\ (mR_A^3+nR_o^3)$,--

Signed and Sealed this

Twenty-second Day of January, 2008

JON W. DUDAS
*Director of the United States Patent and Trademark Office*